F. A. FRENCH.
REPAIRMAN'S TRUCK.
APPLICATION FILED OCT. 24, 1911.
1,136,327.
Patented Apr. 20, 1915.
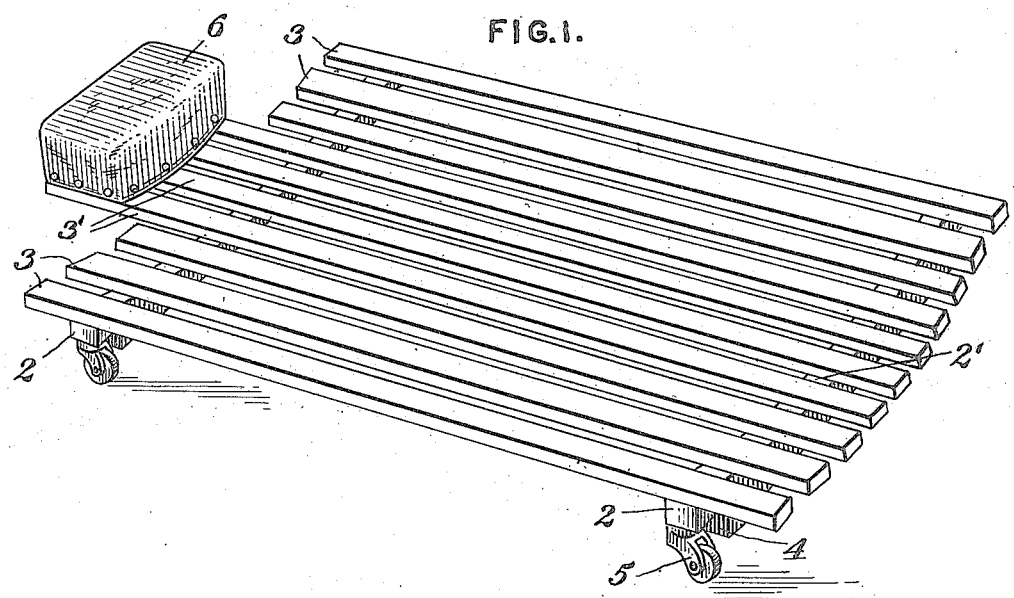
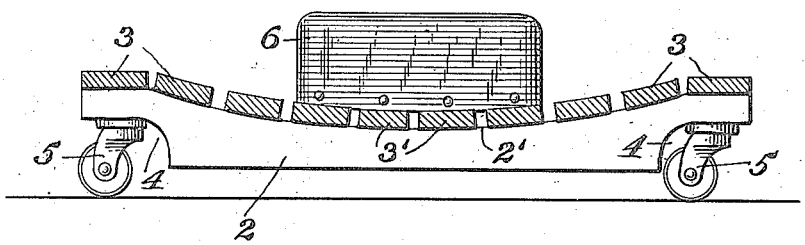

UNITED STATES PATENT OFFICE.

FRANK A. FRENCH, OF PITTSBURGH, PENNSYLVANIA.

REPAIRMAN'S TRUCK.

1,136,327.   Specification of Letters Patent.   Patented Apr. 20, 1915.

Application filed October 24, 1911. Serial No. 656,551.

*To all whom it may concern:*

Be it known that I, FRANK A. FRENCH, a resident of Pittsburgh, in the county of Allegheny and State of Pennsylvania, have invented certain new and useful Improvements in Repairmen's Trucks, of which the following is a specification.

The object of this invention is to provide an efficient truck-like body rest or support on which a repairman may recline while working in a relatively low space, as beneath an automobile. His position is less cramped and he may move more readily and with less damage to his clothing than when lying on the floor.

In the accompanying drawings, Figure 1 is a perspective of the improved truck, and Fig. 2 is a cross-section.

Referring to the drawings, the truck-forming frame consists of the cross pieces, 2, having their top faces formed with end portions relatively flat and with the intermediate portion curved downwardly as indicated at 2' said faces imparting similar configuration to the top surface of the truck formed by longitudinal parallel strips 3, 3', secured to cross pieces 2 in any suitable manner. The ends of pieces 2 are undercut or recessed upwardly at 4 to provide room for the swivel casters 5, the truck thus standing relatively low or close to the floor and occupying little head room.

The intermediate longitudinal strips 3' are extended at one end beyond the extremity of the strips 3 at either side, and secured to these extended portions is the head rest or support 6 which may consist of a suitably cushioned or covered block, said support 6 being located at a point beyond and spaced from the plane of the cross-pieces, thereby tending to relieve the head of the user from the jars and jolts provided by the movements of the truck over the floor. The truck is preferably of such length as to support the body of the operator, with his feet projecting out onto the floor so that he may readily shift his position as desired. With the strips at either side shorter than the intermediate strips, the man lying on the truck is frequently enabled to move himself into closer proximity to the work or in a more convenient position for making repairs than would be possible with the truck frame of uniform length from one side to the other. The curvature of the top surface of the truck renders the same more comfortable for the operator and enables him to maintain his position on the truck more readily than though it were flat, while the flat side portions of the surface permit the operator to retain his tools in a convenient position without liability of their falling off or passing beneath his body.

I claim:—

1. A repairman's truck adapted to receive the repairman and his repair tools in a manner to permit the repairman to position the truck and its contents within a low space with the repairman free to operate within said space, said truck comprising a rigid frame composed of supporting cross-pieces having their top surfaces formed with substantially flat end portions and curved downwardly between such end portions, longitudinal slats spaced apart and secured to the flat and curved surfaces of the cross pieces and providing a slotted supporting surface following the configuration of the cross-pieces, the slats at opposite sides of the slat-formed surface being of equal length and the intermediate slats projecting at one end beyond the slats of equal length, a head-rest supported by the extended ends of the intermediate slats, and casters positioned adjacent the ends of and depending from the cross-pieces.

2. A repairman's truck adapted to receive the repairman and his repair tools in a manner to permit the repairman to position the truck and its contents within a low space with the repairman free to operate within said space, said truck comprising a rigid frame composed of cross pieces having their top faces formed with relatively flat ends and with the intermediate portion curved downwardly, the ends of said pieces being undercut to provide recesses at their under sides, casters mounted in the recesses and supporting the bottom edges of said pieces clear of the floor, longitudinal pieces secured to the flat and curved top edges of the cross pieces and forming a top surface which is intermediately curved complementary with the cross pieces, and a head rest.

In testimony whereof I affix my signature in presence of two witnesses.

FRANK A. FRENCH.

Witnesses:
  J. M. NESBIT,
  F. E. GAITHER.